United States Patent [19]

Sharma

[11] Patent Number: 5,300,256
[45] Date of Patent: Apr. 5, 1994

[54] SOLID-FORM ADDITIVE SYSTEMS DISPERSIBLE IN AQUEOUS MEDIA

[75] Inventor: Mahendra K. Sharma, Kingsport, Tenn.

[73] Assignee: Eastman Chemical Company, Kingsport, Tenn.

[21] Appl. No.: 956,532

[22] Filed: Oct. 5, 1992

Related U.S. Application Data

[60] Division of Ser. No. 513,389, Apr. 23, 1990, Pat. No. 5,153,024, and a continuation-in-part of Ser. No. 392,759, Aug. 11, 1989, Pat. No. 5,204,022.

[51] Int. Cl.$^5$ .......................... B01F 3/12; B01J 13/04; C08J 3/205; C08K 9/10
[52] U.S. Cl. ................. 252/363.5; 106/504; 252/182.29; 252/404; 252/406; 428/402.2; 428/402.22; 524/800; 524/801
[58] Field of Search .............. 252/182.29, 311, 314, 252/351, 363.5; 428/402.24, 402.2, 402.22; 427/213.36; 106/504; 524/800, 801

[56] References Cited

U.S. PATENT DOCUMENTS

| | | | |
|---|---|---|---|
| 2,181,800 | 11/1939 | Crossley et al. | 252/363.5 X |
| 2,942,997 | 6/1960 | Bram et al. | 106/504 X |
| 3,161,602 | 12/1964 | Herbig et al. | 427/213.36 |
| 3,402,137 | 9/1968 | Fischer et al. | 252/363.5 X |
| 3,495,988 | 2/1970 | Balassa | 99/71 |
| 3,505,244 | 4/1970 | Cessna | 252/391 |
| 3,856,699 | 12/1974 | Miyano et al. | 252/316 |
| 4,167,503 | 9/1979 | Cipriani | 252/363.5 X |
| 4,341,677 | 7/1982 | Tamosauskas | 523/421 |
| 4,483,948 | 11/1984 | Tamosauskas | 523/205 |
| 4,591,609 | 5/1986 | Kubo et al. | 523/336 |
| 4,606,940 | 8/1986 | Frank et al. | 427/213.32 |
| 4,619,705 | 10/1986 | Dixon et al. | 106/288 B |
| 4,670,181 | 6/1987 | Mollinger et al. | 252/186.25 |
| 4,826,550 | 5/1989 | Shimizu et al. | 156/166 |
| 4,919,841 | 4/1990 | Kamel et al. | 252/186.26 |
| 4,960,814 | 10/1990 | Wu et al. | 524/312 |
| 5,153,029 | 10/1992 | Sharma | 427/213.36 |
| 5,204,022 | 4/1993 | Sharma | 252/363.5 |

FOREIGN PATENT DOCUMENTS 56-021815 2/1981 Japan.
86/04909 2/1986 PCT Int'l Appl.

OTHER PUBLICATIONS

Emulsions: Theory and Practice, American Chemical Society Monograph Series, by Paul Becher, pp. 189-208 (Reinhold Publishing Corp., NY. 1957).

"The HLB System: a time-saving guide to emulsifier selection", a publication of ICI Americas Inc., pp. 18-19.

*Primary Examiner*—Richard D. Lovering
*Attorney, Agent, or Firm*—Mark A. Montgomery; Thomas R. Savitsky

[57] ABSTRACT

Solid form additive systems which are dispersible in aqueous media are disclosed, as are methods for preparing such additive systems and methods for dispersing such additive systems in aqueous media. Also disclosed are methods for applying additives to polymeric particles and the polymeric particles treated by such methods.

15 Claims, No Drawings

SOLID-FORM ADDITIVE SYSTEMS DISPERSIBLE IN AQUEOUS MEDIA

This is a divisional application of copending application Ser. No. 07/513,389 filed on Apr. 23, 1990, now U.S. Pat. No. 5,153,024, and a continuation-in-part of application Ser. No. 392,759, filed Aug. 11, 1989, now U.S. Pat. No. 5,204,022 which is incorporated herein by reference in its entirety.

DESCRIPTION

1. Field of Invention

This invention relates to solid form additive systems which are dispersible in aqueous media. In one aspect, the present invention relates to the preparation of such additive systems. In another aspect, the present invention relates to methods of applying additives to polymeric particles. In a further aspect, the present invention relates to polymeric particles treated by such methods.

2. Background of the Invention

Known methods of introducing additives to polymeric particles include dry blending the materials, melting, and compounding the melted blend with extruders and pelletizing or powdering to the desired physical form. The additives employed to treat polymeric particles include antioxidants, processing aids, slip agents, antiblocking agents, antistatic agents, lubricants, UV stabilizers, coupling agents and colorants.

Another method of introducing additives to polymeric particles is to contact such particles with additive at the extruder hopper during end use processing. Additives such as colorants, slip agents, processing aids, blowing agents, and others are introduced to virgin polymeric particles at this stage usually in concentrate form. In many instances, difficulty is encountered in metering the exact amounts of additive concentrate necessary to do a specific job. This is especially true for additives such as processing aids and external lubricants which are used at very low levels and usually cannot be added in a concentrate form.

Some polymers are presently being manufactured with technology that does not lend itself to such techniques as melt compounding and pelletizing. Many polymers such as high density polyethylene, linear low density polyethylene, and polypropylene emerge from the polymerization reactor in a dry granular form, i.e., in a form similar to that of a fluidized bed system. Presently, additives for these polymers must be introduced by melting, compounding, and then pelletizing. This extra step increases the cost of such polymer manufacturing operations and can adversely affect the properties of such polymers.

Another method of coating polymeric particles with additives is disclosed in Japanese Patent 56-021815, issued to Tokoyama Soda. This patent teaches contacting polypropylene granules with a dispersion of additives in a solvent, followed by removal of the solvent. While some stabilization is thereby imparted to the coated polypropylene granules, the treated pellets have severe static electricity problems when subsequently processed, such as for example, by extrusion.

It would be desirable to have available a simple process for applying additives to polymeric particles in order to enhance the stability of the particles without adversely affecting the physical properties and processability of the treated particles. Typical additives employed for treating polymeric particles have been applied using organic solvents since such additives are typically insoluble in water. Due to the ever increasing cost of organic solvents, the high cost of solvent recovery systems, as well as the toxicity and explosive nature of organic solvents, plus the strict air-quality controls imposed by federal regulations, there is a great deal of motivation for users of polymer additives to switch to water as the solvent of choice for applying such additives to polymeric particles.

Yet another prior art process for the application of additives to polymeric particles involves the preparation of aqueous emulsions of additives, as disclosed, for example, in Patent Cooperation Treaty Document WO 86/04909. This process also discloses coating of polymeric particles by employing an aqueous emulsion or dispersion of additives, such as antioxidants, thermal stabilizing agents, colorants, and the like. These aqueous emulsions or dispersions can be applied by spray, wipe, dip systems, or the like to coat the polymeric particles before their normal drying or degassing operations.

While the latter application system represents an advance in the state of the art by replacing the need for organic solvents with aqueous-based application systems, the main disadvantage of this aqueous application system is that it contains substantial quantities of water, which requires special handling and shipping of the aqueous emulsions or dispersions. For example, these emulsions or dispersions tend to freeze when exposed to extremely cold temperatures. Unfortunately, merely heating the frozen emulsion or suspension does not always result in the re-formation of stable emulsions or dispersions. Thus, exposure to temperature extremes and long term storage can cause problems in processing these aqueous emulsions or dispersions when it is attempted to apply these additive systems to polymer particles.

Copending application Ser. No. 392,759, filed Aug. 11, 1989, now U.S. Pat. No. 5,204,022, discloses a process for preparation of water-dispersible additives in solid form wherein a grinding step is required to achieve the additives in solid powder form. If the melting temperature of the additives is less than 100° C., cryogenic grinding is needed to obtain additives in powder form. The cryogenic grinding is costly. Therefore, it would be desirable to develop a process which eliminates the need for cryogenic grinding of the additives with melting temperatures less than 100° C. in order to obtain additives in fine particle form.

In order to overcome the limitations cited above, it would be desirable to prepare additive systems for the treatment of polymer particles wherein the additive systems can be handled in solid form, are readily water dispersible to produce aqueous application systems useful for the treatment of polymer particles, and eliminate the need for cryogenic grinding.

SUMMARY OF THE INVENTION

In accordance with the present invention, a wide range of organic additives, such as antioxidants, thermal stabilizers, colorants, or the like, can be rendered water dispersible. Additional additives contemplated for use in the practice of the present invention include lubricants, mold release agents, antistatic agents, and the like. The water dispersible additive systems of the invention are easily handled because of their solid, typically free-flowing form. The water dispersible additive systems of the invention (alternatively referred to herein as "solid emulsions") can be readily dispersed in water to produce an aqueous emulsion or dispersion which can be used to coat polymeric particles before performing normal drying or degassing operations which are typically employed in normal polymer preparation and treatment environment. Coating of polymeric particles can be accomplished employing a variety of techniques, e.g., employing spray, wipe or dip systems.

The water dispersible additive systems of the invention can be formulated for treating a wide variety of polymeric particle materials which can then be formed into articles made from such polymer particles. The resulting articles can be used in a wide range of applications, e.g., as film or packaging for food, medicine, and the like.

Polymers which emerge from a polymerization reactor in particle form would substantially benefit from the application of such solid emulsions containing polymer additives such as antioxidants. The solid emulsions of the invention are typically applied to polymer particles by preparing an aqueous suspension of the solid emulsion and the polymer particles which facilitate wetting or coating of the polymer particles by the polymer additives, followed by drying to remove water. This means of introducing additives would eliminate melt compounding, lower production energy requirements, and minimize heat history on the polymer particles.

DETAILED DESCRIPTION OF THE INVENTION

In accordance with the present invention, there is provided a method for rendering at least one meltable polymer additive having a melting temperature no higher than 100° C. and, optionally, one or more higher melting polymer additives, dispersible in aqueous media, said method comprising:

a) heating said additive to a temperature sufficient to produce a melt phase,
  b) combining the resulting melt phase, at a temperature sufficient to maintain a melt phase, with at least one surfactant having a low hydrophobic-lipophobic balance value and at least one surfactant having a high hydrophobic-lipophobic balance value, wherein said combining is carried out under sufficient agitation to provide a homogeneous mixed melt,
  c) contacting the homogeneous melt phase obtained from step b) with a sufficient amount of water and under sufficient agitation and temperature to result in a water-in-oil emulsion, and
  d) allowing the water-in-oil emulsion obtained from step c) to cool so as to obtain a water dispersible encapsulated solid material in powder form having a particle size of about 5.0 to about 1000.0 μm.

In accordance with another embodiment of the present invention, the surfactant having a high hydrophobic-lipophobic balance value is contacted with said polymer additive after performance of step d), rather than in step (b).

In accordance with yet another embodiment of the present invention, there is provided an encapsulated composition of matter dispersible in aqueous medium (i.e., a solid emulsion), said composition comprising:

i) one or more water insoluble, meltable polymer additives and, optionally, one or more higher melting, water insoluble polymer additives, wherein substantially all of said polymer additives have a particle size of less than about 40 μm,
  ii) at least one low hydrophobic-lipophobic balance value surfactant, wherein said surfactant is adsorbed on the surface of said water insoluble polymer additive particles, and
  iii) at least one high hydrophobic-lipophobic balance value surfactant, wherein said composition is in powder form having a particle size of about 5.0 to about 1000.0 μm and contains about 2.0 to about 40.0 weight % of encapsulated water.

In accordance with still another embodiment of the present invention, there is provided a process for dispersing water insoluble polymer additives in aqueous medium by contacting the above-described solid emulsion compositions with an aqueous medium under conditions of agitation and for a time sufficient to wet the composition with water.

In accordance with a further embodiment of the present invention, there is provided a method of applying additives to polymeric particles comprising contacting such particles with the above-described aqueous emulsion or dispersion containing the solid emulsion and, optionally, drying the resulting particles.

In accordance with a still further embodiment of the present invention, there are provided stabilized polymer particles treated by the above-described method.

The polymer additives employed in the practice of the present invention may be selected from antioxidants, e.g., tetrakis[methylene 3-(3',5'-di-tert-butyl-4'-hydroxyphenyl)-propionate]methane, octadecyl 3-(3',5'-di-t-butyl-4-hydroxyphenyl)propionate, 1,3,5-trimethyl-2,4,6-tris-(3,5-di-tert-butyl)-4-(hydroxybenzyl)benzene, bis(2,4-di-t-butyl-phenyl) pentaerythritol diphosphite, tris(mono nonylphenyl) phosphite, 4,4'-butylidene-bis(5-methyl-2-t-butyl)phenol, tris(3,5-di-t-butyl-4-hydroxybenzyl)isocyanurate, tris-nonylphenyl phosphite; distearyl pentaerythritol diphosphite; tetrakis-(2,4-di-t-butylphenyl)-4,4'-biphenylylene-diphosphonite; tris-(2,3-di-t-butylphenyl) phosphite; butylated hydroxy toluene; dicetyl thiodipropionate; dimyristyl thiodipropionate; poly(1,4-cyclohexylenedimethylene-3,3'-thiodipropionate (partially terminated with stearyl alcohol); and the like; coupling agents, e.g., silanes; titanates; chromium complexes; low molecular weight polyolefins (with carboxylic moieties); high molecular weight polyolefins and acrylates (with carboxylic moieties); chlorinated paraffins; and the like; antistatic agents, e.g., glycerol monostearates; ethyoxylated amines; polyethylene glycol; quaternary ammonium compounds (salts); and the like; nucleating agents, e.g., sodium benzoate; diphenyl phosphinic acid (including magnesium, sodium, calcium, aluminum salts); phenyl phosphinic acid (including salts); phenyl phosphorous acid (including salts); and the like; metal deactivators, e.g., oxalyl bis(benzylidene, hydrazide); 2,2'-oxamido bis-(ethyl 3-(3,5-di-t-butyl-4-hydroxyphenyl)propionate; and the like; lubricants/slip agents/antiblocking agents, e.g., diatomaceous silica (earth); talc; clay; metallic stearates; alkyl bisstearamids; glycerol monostearates; polyethylene glycol; erucamid; oleamid, and the like; UV inhibitors, e.g., 2-hydroxy-4-octoxybenzophenone; 2-hydroxy-4-isooctoxybenzophenone; 4-hydroxy-4-n-dodecyloxybenzophenone; 2-(3-di-t-butyl-2-hydroxy-5-methylphenyl-5-chlorobenzotriazole; 2-(2-hydroxy-3,5-di-t-amylphenyl) benzotriazole; p-t-butylphenyl salicylate; 2,4-di-t-butylphenyl-3,5-di-t-butyl-4- hydroxybenzoate; nickel bis-ortho-ethyl(3,5-di-t-butyl-4-hydroxybenzyl)-phosphonate; 2,2',6,6'-tetramethyl-4-piperidinyl sebacate, and the like; flame retardants, e.g., decabromodiphenyl oxide; dodecachlorodimethane dibenzocyclooctane; ethylene bis-dibromo norbornane dicarboximide; ethylene bis-tetrabromophthalimide; antimony trioxide, and the like; biocides, e.g., methyl paraben, ethyl paraben, propyl paraben, halogenated alkyl organic compounds, transition metal carbamate salts, and the like; as well as mixtures of any two or more of the above mentioned classes of compounds, or mixtures of two or more compounds from within a given class of compound.

In the process for producing the solid emulsions of the invention, temperatures sufficient to produce a melt phase, as contemplated by the invention method (i.e., for step a)), can vary widely. Since many different additives can be processed in accordance with the present invention, a melt phase can be obtained with some additives at temperatures as low as about 30° C.; however, at least one additive will require a temperature no higher than 100° C. to obtain a melt phase. Preferably, temperatures employed to produce a melt phase from the combination of additives will fall in the ranges of, for example, about 0° C. up to 100° C., about 0° C. to about 80° C., and about 0° C. to about 40° C.

Of the polymer additives contemplated for use in the practice of the present invention, those referred to as "meltable polymer additives" are those which melt without substantial levels of degradation to produce a melt phase having a melt viscosity in the range of about 1–1000 cp when subjected to temperatures sufficient to produce a melt phase. Preferred meltable polymer additives are those which produce a melt phase having a melt viscosity in the range of 1–500 cp when heated to temperatures sufficient to produce a melt phase (but no higher than 100° C.).

Higher melting polymer additives contemplated for optional use in the practice of the present invention are materials which require elevated temperatures to melt or which suffer from substantial levels of degradation upon exposure to elevated temperatures. Such additives are also characterized by their ability to be dispersed or dissolved in the melt phase produced by the meltable polymer additive.

The hydrophobic-lipophobic balance of a surfactant is an expression of the balance of the size and strength of the hydrophilic (polar) and the lipophilic (non-polar) groups of the surfactant.

As used herein, the term "low hydrophobic-lipophobic balance value surfactants" refers to surfactants having a hydrophobic-lipophobic balance value less than about 9, while the term "high hydrophobic-lipophobic balance value surfactant" refers to surfactant having a hydrophobic-lipophobic balance value of greater than about 9. Preferably, low hydrophobic-lipophobic balance value surfactant employed in the practice of the present invention will have a hydrophobic-lipophobic balance value falling in the range of about 2 up to 8, while preferred high hydrophobic-lipophobic balance value surfactants employed in the practice of the present invention will have a hydrophobic-lipophobic balance value of at least about 10.

Hydrophobic-lipophobic balance values can be determined in a variety of ways. For example, hydrophobic-lipophobic balance numbers for certain types of non-ionic agents, such as polyoxyethylene derivatives of fatty alcohols and polyhydric alcohol fatty acid esters, including those of polyglycols, can be calculated with the aid of the following equation:

$$HLB = 20\left(1 - \frac{S}{A}\right)$$

where S is the saponification number of the ester and A is the acid number of the acid. Thus, for a glyceryl monostearate with S=161 and A=198, this equation gives a hydrophobic-lipophobic balance value for this material of 3.8.

For other surfactants such as esters of tall oil and rosin, bees wax, lanolin, and the like, hydrophobic-lipophobic balance values can be calculated from the equation:

$$HLB = \frac{E + P}{5}$$

where E is the weight percentage of oxyethylene content and P is the weight percentage of the polyhydric alcohol content.

While the above formulas are satisfactory for many surfactants, the hydrophobic-lipophobic balance values for many surfactants must be estimated by experimental methods. The experimental method of hydrophobic-lipophobic balance value determination entails blending the unknown surfactant in varying ratios with a surfactant having a known hydrophobic-lipophobic balance value, then using the blend to emulsify an oil for which the hydrophobic-lipophobic balance required to emulsify the oil (the "required HLB") is known. The blend which performs the best is deemed to have a hydrophobic-lipophobic balance value approximately equal to the required HLB of the oil, so that the hydrophobic-lipophobic balance value for the unknown material can be calculated.

A rough approximation of the hydrophobic-lipophobic balance value for a range of surfactants can be obtained by evaluation of the water solubility of the particular surfactant as summarized in the following table:

| Behavior When Added to Water | HLB Range |
|---|---|
| No dispersibility in water | 1–4 |
| Poor dispersion | 3–6 |
| Milky dispersion after vigorous agitation | 6–8 |
| Stable milky dispersion (upper end almost translucent) | 8–10 |
| From translucent to clear dispersion | 10–13 |
| Clear solution | 13+ |

Exemplary low hydrophobic-lipophobic balance value surfactants contemplated for use in the practice of the present invention include:
mono- and diglycerides,
sorbitan fatty acid esters,
polyoxyethylene sorbitol esters,
polyoxyethylene alcohols,
ethoxylated alkylphenols,
ethoxylated alcohols,
polyalkylene glycol ethers,
phosphated mono- and diglycerides,
citric acid esters of monoglycerides, diacetylated tartaric acid esters of monoglycerides,
glycerol monooleate,
sodium stearoyl lactylates,
calcium stearoyl lactylates,
phospholipids, or
phosphatidyl ethanolamine,
as well as mixtures of any two or more thereof.

Exemplary high hydrophobic-lipophobic balance value surfactants contemplated for use in the practice of the present invention include:
glycerol monostearate,
polyoxyethylene sorbitan fatty acid esters,
polyethylene sorbitol esters,
polyoxyethylene acids,
polyoxyethylene alcohols,
polyoxyethylene alkyl amines,
alkyl aryl sulfonates, or
ethoxylated alkylphenols,
as well as mixtures of any two or more thereof.

The amount of surfactant employed in the practice of the present invention can vary widely. Typically, the total amount of surfactants employed will fall in the range of about 0.5 up to 40.0 wt %, based on the total weight of the final composition (i.e., the solid emulsion); with the total amount of surfactants falling in the range of about 1.0 up to 10.0 wt % being preferred.

The weight ratio of low hydrophobic-lipophobic balance value surfactants to high hydrophobic-lipophobic balance value surfactants employed in the practice of the present invention can vary widely. Typically, the weight ratio of low-hydrophobic-lipophobic balance value surfactant to high hydrophobic-lipophobic balance value surfactant will fall in the range of about 0.1 up to 10:1; with weight ratios in the range of about 0.5 up to 2:1 being preferred.

The components of the invention composition can be combined in most any convenient manner. Thus, all components can be combined, then heated to produce a melt, or the meltable component can be heated alone, followed by addition of the other components, and so on. It is presently preferred that all additives contemplated for a given composition be combined and melted, then the low hydrophobic-lipophobic balance value surfactant(s) added, followed by addition of the high hydrophobic-lipophobic balance value surfactant(s).

Agitation of the melt phase is desirable to aid production of a substantially homogeneous melt. Agitation can be provided by any suitable means, such as mechanical stirring, shaking, and the like.

The combination is maintained under melt conditions and agitated for a time sufficient to produce a substantially homogeneous melt phase.

The amount of water typically used to form the water-in-oil emulsion (i.e., for step c)) is about 2.0 to about 40.0 weight %, preferably about 5.0 to about 20.0 weight %, based on the total weight of the emulsion. The water added to form the water-in-oil emulsion can optionally contain up to 50.0 weight % of an additional additive such as antioxidants, processing aids, slip agents, antiblocking agents, or lubricants. The temperature during formation of the water-in-oil emulsion (i.e., during step c)) is about the same as used for step b). Thus, the temperature used is sufficient to melt at least the lowest melting additives present and preferably is about 5° C. up to 20° C. above the melting point of the lowest melting polymer additive present, but in no case is higher than 100° C. The rate of cooling and the amount of agitation for step d) is that amount sufficient to form an encapsulated polymer material in powder form having a particle size of about 5.0 to about 1000.0 $\mu$m, preferably about 5.0 to about 500.0 $\mu$m. Therefore, the need for additional grinding or other particle size reduction methodology is eliminated and the encapsulated particles produced are easily dispersible in water or an aqueous medium. A typical rate of cooling is about 10° C./hour to about 100° C./hour. On cooling the melted ingredients convert to a fine particle form containing water encapsulated in the melt phase which on cooling solidify and produce the polymer material in powder form, i.e., produce the solid emulsions of the invention.

The solid emulsions prepared in accordance with the present invention may contain a variety of emulsifiable waxes, e.g., an emulsifiable polyethylene wax having a density of 0.939, a melt viscosity of 250 cp at 125° C. and an acid number of 16. The emulsifiable wax, if present, is added to the melt phase of the polymer additive. If present, said wax will be typically in an amount of about 1 to about 50 weight percent, based on the weight of the polymer additive(s). The emulsifiable wax contemplated for use in the practice of the present invention may be any wax which can be readily emulsified, for example, emulsifiable polyolefin waxes such as oxidized polyolefin waxes or modified polyolefin waxes. Preferred oxidized polyolefin waxes include waxes having a density in the range of about 0.92–0.96, melt viscosities in the range of about 50–4,000 cp at 125° C. and an acid number in the range of about 12–55. Exemplary waxes include an oxidized polyethylene wax having a density of 0.939, a melt viscosity of 250 cp at 125° C. and an acid number of 16; an oxidized polyethylene wax having a density of 0.942, a melt viscosity of 900 cp at 125° C. and an acid number of 15; an oxidized polyethylene wax having a density of 0.955, a melt viscosity of 250 cp at 125° C. and an acid number of 16; and a maleated polypropylene wax having a density of 0.934, a melt viscosity of 400 cp at 190° C. and an acid number of 47.

The invention compositions are readily dispersed in aqueous media, typically by adding up to 50 wt % of the solid emulsion to an aqueous medium, and agitating sufficiently to promote contact between the particles of additive and the aqueous media. Any suitable means to promote such contacting is acceptable for the desired agitation.

When the solid emulsion produced by the present invention is dispersed in aqueous media, stable suspensions are obtained which have a particle size of about 0.5 to about 250.0 $\mu$m, preferably about 1.0 to about 100.0 $\mu$m.

Depending on factors such as the particle size of the solid emulsion to be dispersed, the temperature of the aqueous media, the quantity of polymer additive(s), the quantity (and ratio) of high and low hydrophobic-lipophobic value surfactants, and the like, the contact time required for dispersion of the additive(s) of the solid emulsion can be as short as a few minutes up to 3 hours or longer. Preferably, under typical operating conditions, it will take in the range of about 0.1 up to 1 hour for complete dispersion of the additive(s).

The invention compositions (i.e., solid emulsions) can be dispersed in aqueous media in large quantities. Thus, loading of up to about 50 wt % solids in aqueous media are contemplated. Preferred loading levels fall in the range of about 5 up to 25 wt %, based on the total weight of polymer additive(s) and low hydrophobic-lipophobic balance value surfactant. Since it is frequently added separately to the aqueous media, the quantity of high hydrophobic-lipophobic balance value surfactant is indicated separately to vary in the range of about 0.1 up to 10 wt %, with quantities in the range of about 0.1 up to 1 wt % being preferred.

The dispersions or emulsions may also contain surfactants and emulsifiers such as commercially available Tergitol 15-S-15 [an ethoxylated linear alcohol having a hydrophilic-lipophilic balance of 15.4, as determined according to Griffin, W. C., Office, Dig. Federation Paint Varnish Prod. Blubs, 28 446 (1956)], and anti-foam agents such as SWS-211 (a mixture of food grade emulsifiers, 10% by wt silicone compounds, and water). Such emulsions may also contain potassium hydroxide, sodium tetraborate, sodium carbonate, sodium bicarbonate, calcium carbonate or magnesium carbonate, morpholine, 2-amino-2-methylpropanol, tall oil fatty acid, ethylene glycol and ethoxylated stearyl alcohol [commercially available as Industrol A99], and the like.

The above-described aqueous emulsions or dispersions are useful, for example, for applying numerous polymer additives, either alone or in combination, to a wide range of polymer particles. This is readily accomplished by contacting the polymer particles with the above described aqueous emulsion or dispersion, e.g., by spraying the dispersion on the polymer particles, mixing polymer particles with the aqueous dispersion, and the like.

The polymer particles treated with the solid emulsions (in dispersion form) of the present invention can be any polymer that is in the form of beads, fine powder, pellets, and the like.

Some preferred polymeric particles include, for example, polyolefins such as crystalline polypropylene, low density polyethylene, high density polyethylene and linear low density polyethylenes. Other polymeric materials include, for example, polystyrene, polyesters, polyamides and the like as well as copolymers such as crystalline propylene ethylene copolymers, rubbers such as ethylene propylene rubber and the like.

The present invention provides polymeric particles which are stabilized in the above-mentioned unique and efficient manner.

The invention will now be described in greater detail with reference to the following non-limiting examples.

EXAMPLES

Example 1

This example illustrates the preparation of water-dispersible Irganox ® 1076 used as a thermal stabilizer and antioxidant for polymeric particles employing the process of the present invention. Irganox ® 1076 is chemically known as octadecyl 3-(3',5'-di-tert-butyl-4'-hydroxyphenyl)propionate or octadecyl 3,5-di-tert-butyl-4-hydroxyhydrocinnamate, and supplied by Ciba-Geigy. The surfactants used were ethoxylated alkylphenols commercially known as Igepal ® surfactants from GAF Corporation. An aqueous-dispersible material in the solid emulsion form contained the following ingredients:

| Ingredients | Amount (g) | (%) |
|---|---|---|
| Irganox ® 1076 | 50.0 | 53.1 |
| Epolene ® E-14 | 10.0 | 10.6 |
| Calcium Stearate | 15.9 | 16.9 |

-continued

| Ingredients | Amount (g) | (%) |
|---|---|---|
| Igepal ® CO-210 | 1.4 | 1.5 |
| Igepal ® CO-630 | 1.9 | 2.0 |
| Water | 15.0 | 15.9 |

The following procedure was used for converting water-insoluble ingredients to water-dispersible solid emulsion form.

1. Heat Irganox ® 1076, Epolene ® E-14 and calcium stearate in a glass container at 60°–70° C. using water bath or glass-col. The melt was stirred to obtain the homogeneous melt phase.

2. Add to the melt phase a low HLB surfactant (e.g., Igepal ® CO-210). The surfactant was mixed completely by stirring device.

3. Add to the melt phase (Step 2) a high HLB value surfactant (e.g., Igepal ® CO-630). The surfactant was completely mixed in the melt phase by stirring device.

4. Water was added to the melt phase (Step 3) slowly during stirring the melt phase. A water-in-oil emulsion was obtained which contained melt phase as a continuous medium.

5. Cool the ingredients at room temperature, while continuous stirring the melt phase. On cooling, the melted ingredients convert to the fine particle form containing water encapsulated in the melt phase which on cooling solidify and produce solid emulsion in fine powder form.

EXAMPLE 2

This example illustrates the preparation of an aqueous suspension using solid emulsion obtained from the process of the present invention. An aqueous-dispersible material prepared in accordance with Example 1 was employed for preparing an aqueous suspension. 20 g of solid emulsion in fine powder form were dispersed in 80 g of $H_2O$ using magnetic stirrer. Stable suspensions were obtained. The material remained dispersed in water for several weeks. Typical particle size of the dispersion was:

| % Relative Volume | Particle size μm |
|---|---|
| 10 | 3.25 |
| 50 | 9.45 |
| 90 | 24.05 |

The particle size of the additives dispersed in water is large enough to promote settling. However, no settling was observed for several days, which may be due to the density of dispersed phase close to water and the proper selection of the surfactants.

EXAMPLE 3

Example 1 was repeated with the exception that the amount of water used was 22.5 g instead of 15.0 g in preparing the water-dispersible additives in solid emulsion form. The composition of water-dispersible additives was as follows:

| Ingredients | Amount (g) | (%) |
|---|---|---|
| Irganox ® 1076 | 50.0 | 49.2 |
| Epolene ® E-14 | 10.0 | 9.8 |

-continued

| Ingredients | Amount (g) | (%) |
| --- | --- | --- |
| Calcium Stearate | 15.9 | 15.6 |
| Igepal ® CO-210 | 1.4 | 1.4 |
| Igepal ® CO-630 | 1.9 | 1.9 |
| Water | 22.5 | 22.1 |

An aqueous dispersion was prepared in accordance with Example 2. Typical particle size of aqueous dispersion was:

| % Relative Volume | Particle size (μm) |
| --- | --- |
| 10 | 3.70 |
| 50 | 10.05 |
| 90 | 25.36 |

EXAMPLE 4

Example 1 was repeated with the exception that the amount of water used was 30.0 g instead of 15.0 g in preparing water-dispersible additives in solid emulsion form. The composition of the water-dispersible additives was as follows:

| Ingredients | Amount (g) | (%) |
| --- | --- | --- |
| Irganox ® 1076 | 50.0 | 45.8 |
| Epolene ® E-14 | 10.0 | 9.2 |
| Calcium Stearate | 15.9 | 14.6 |
| Igepal ® CO-210 | 1.4 | 1.3 |
| Igepal ® CO-630 | 1.9 | 1.7 |
| Water | 30.0 | 27.4 |

The material was water-dispersible. Stable dispersions were obtained, which did not settle for several days.

EXAMPLE 5

Example 1 was repeated with the exception that the amount of water employed was 37.5 g instead of 15.0 g in preparing water-dispersible additives in solid emulsion form. The composition of water-dispersible additives was as follows:

| Ingredients | Amount (g) | (%) |
| --- | --- | --- |
| Irganox ® 1076 | 50.0 | 42.8 |
| Epolene ® E-14 | 10.0 | 8.6 |
| Calcium Stearate | 15.9 | 13.6 |
| Igepal ® CO-210 | 1.4 | 1.2 |
| Igepal ® CO-630 | 1.9 | 1.6 |
| Water | 37.5 | 32.2 |

An aqueous dispersion was prepared in accordance with Example 2. Typical particle size of aqueous dispersion was:

| % Relative Volume | Particle size (μm) |
| --- | --- |
| 10 | 3.42 |
| 50 | 9.35 |
| 90 | 23.22 |

EXAMPLE 6

Example 1 was repeated with the exception that the Epolene ® E-14 and calcium stearate were eliminated from the formulation. The water-dispersible additive in solid emulsion form contains the following ingredients:

| Ingredients | Amount (g) | (%) |
| --- | --- | --- |
| Irganox ® 1076 | 50.00 | 80.4 |
| Igepal ® CO-210 | 0.92 | 1.5 |
| Igepal ® CO-630 | 1.25 | 2.0 |
| Water | 10.00 | 16.1 |

The solid emulsion in fine powder form was obtained, which was dispersible in water:

EXAMPLE 7

Example 6 was repeated with the exception that the formulation includes Epolene ® E-14. The water-dispersible additive obtained in the solid emulsion form has the following composition:

| Ingredients | Amount (g) | (%) |
| --- | --- | --- |
| Irganox ® 1076 | 50.0 | 71.8 |
| Epolene ® E-14 | 7.5 | 10.8 |
| Igepal ® CO-210 | 0.9 | 1.3 |
| Igepal ® CO-630 | 1.2 | 1.7 |
| Water | 10.0 | 14.4 |

An aqueous dispersion was prepared in accordance with Example 2. Typical particle size of aqueous dispersion was:

| % Relative Volume | Particle size (μm) |
| --- | --- |
| 10 | 4.5 |
| 50 | 11.6 |
| 90 | 25.9 |

The stable dispersions were obtained, which did not settle for several days.

EXAMPLE 8

Example 6 was repeated with the exception that the amount of water used was 24.70 g instead of 10 g in preparing additive in solid emulsion form. On cooling, the material obtained was sticky, and water was separated from solid. This example illustrates that an optimum amount of water is required to obtain additives in fine powder form.

EXAMPLE 9

Example 6 was repeated with the exception that the amount of water incorporated was 5.0 g instead of 10.0 g in preparing water-dispersible additives using the process of this invention. On cooling, the solid emulsion was obtained with larger particles as compared to particles obtained using the formulation of Example 6. These observations demonstrate that an optimum amount of water is needed for obtaining additives in fine powder form.

EXAMPLE 10

Example 6 was repeated with the exception that Arlacel ® 80 was used instead of Igepal ® CO-210 in preparing the additive in water-dispersible solid emulsion form. The material was easily water-dispersible, and dispersions did not settle for several days. Typical particle size of the aqueous dispersions was as follows:

| % Relative Volume | Particle size (μm) |
| --- | --- |
| 10 | 4.7 |
| 50 | 10.8 |
| 90 | 24.8 |

EXAMPLE 11

This example illustrates the preparation of water-dispersible distearyl thiodipropionate (DSTDP) using the process of the present invention. An aqueous dispersible material in the solid emulsion form contained the following ingredients:

| Ingredients | Amount (g) | (%) |
| --- | --- | --- |
| DSTDP (Grace Co.) | 50.0 | 77.4 |
| Epolene ® E-14 | 7.5 | 11.6 |
| Arlace ® 80 | 0.9 | 1.4 |
| Igepal ® CO-630 | 1.2 | 1.9 |
| Water | 5.0 | 7.7 |

DSTDP and Epolene ® E-14 were heated up to 90° C. using Glass-Col. Arlacel ® 80 was added to the melt during stirring. After complete mixing, Igepal ® CO-630 was added while stirring the melt phase. The melt was allowed to cool up to 80° C. At 80° C., water was added slowly during continuous stirring in order to obtain water-in-oil emulsion. The melted ingredients were allowed to cool at room temperature, but stirring was continued until melt became viscous in order to minimize the water separation from the melt phase. At room temperature, material was obtained in fine powder form. The stable dispersions were obtained in water, which did not settle for several days.

EXAMPLE 12

Example 11 was repeated with the exception that the amount of water incorporated was 10.0 g instead of 5.0 g in preparing water-dispersible additive in solid emulsion form. The particles were larger compared to the material of Example 11. This example illustrates that an optimum amount of water is required to prepare solid emulsion in fine powder form.

The material obtained was dispersible in water but required more time to disperse in water compared to material with fine particles as obtained in Example 11.

EXAMPLE 13

Example 11 was repeated with the exception that dilauryl thiodipropionate (DLTDP) was used instead of distearyl thioprionate, and DLTDP and Epolene ® E-14 were heated to 55° C. instead of 90° C. to obtain the melt phase. The water-dispersible additive contained the following ingredients:

| Ingredients | Amount (g) | (%) |
| --- | --- | --- |
| DLTDP | 50.0 | 77.4 |
| Epolene ® E-14 | 7.5 | 11.6 |
| Arlacel ® 80 | 0.9 | 1.4 |
| Igepal ® CO-630 | 1.2 | 1.9 |
| Water | 5.0 | 7.7 |

The stable dispersions were obtained. Typical particle size of aqueous dispersions was:

| % Relative Volume | Particle size (μm) |
| --- | --- |
| 10 | 5.21 |
| 50 | 11.05 |
| 90 | 26.50 |

EXAMPLE 14

The water-dispersible additives prepared in accordance with Example 4 were employed to stabilize polymeric particles. Aqueous dispersions containing 20% by weight additives (Example 4) were prepared. The dispersions were further diluted with water to obtain 5% solids.

40 Grams of diluted aqueous dispersion was applied to 500 g of polypropylene pellets having a density of 0.902 and a melt flow rate of 9. The amount of dispersion used was calculated to achieve the solid level of 0.4–0.5% solids by weight on the coated polypropylene pellets. The polypropylene pellets were placed in an oven for 15–20 minutes at 60°–90° C. before starting coating. The pellets should be warm in order to achieve good adhesion of additives employed for coating. The coated polypropylene pellets did not exhibit a color shift when placed in an oven for 72 hours at a temperature of 150° C.

EXAMPLE 15

Example 14 was repeated with the exception that water-dispersible material of Example 10 was used instead of the material of Example 4 for coating polypropylene pellets. The coated pellets did not exhibit a color shift when placed in an oven for 72 hours at a temperature of 150° C.

EXAMPLE 16

Example 14 was repeated with the exception that water-dispersible material of Example 13 was used instead of the material of Example 4 for coating polypropylene pellets. The coated pellets did not exhibit a color change when placed in an oven for 72 hours at a temperature of 150° C.

The invention has been described in detail with particular reference to preferred embodiments thereof, but it will be understood that variations and modifications can be effected within the spirit and scope of the invention.

I claim:

1. An encapsulated composition of matter dispersible in aqueous medium, said composition comprising:
   i) one or more water insoluble, meltable polymer additives and, optionally, one or more higher melting, water insoluble polymer additives, wherein substantially all of said polymer additives have a particle size of less than about 40 μm, ii) at least one low hydrophobic-lipophobic balance value surfactant, wherein said surfactant is adsorbed on the surface of said water insoluble polymer additive particles, and iii) at least one high hydrophobic-lipophobic balance value surfactant, wherein said composition is in powder form having a particle size of about 5.0 to about 1000.0 μm and contains about 2.0 to about 40.0 weight % of encapsulated water.

2. A composition in accordance with claim 1 wherein said polymer additives are selected from the group consisting of:
thermal stabilizing agents,
processing aids,
colorants,
antistatic agents,
coupling agents,
UV stabilizers,
metal deactivators,
nucleating agents, and
flame retardants,
as well as mixtures of any two or more thereof.

3. A composition in accordance with claim 2 wherein said thermal stabilizing agent is an antioxidant and is selected from the group consisting of:
tetrakis[methylene 3-(3',5'-di-tert-butyl-4'-hydroxyphenyl)-propionate]-methane,
octadecyl 3-(3',5'-di-tert-butyl-4-hydroxyphenyl)propionate,
1,3,5-trimethyl-2,4,6-tris-(3,5-di-tert-butyl)-4-(hydroxybenzyl)benzene,
bis(2,4-di-tert-butyl-phenyl)pentaerythritol diphosphite,
tris(monononylphenyl)phosphite,
4,4'-butylidene-bis(5-methyl-2-tert-butyl)phenol,
tris(3,5-di-tert-butyl-4-hydroxybenzyl)isocyanurate,
tris-nonylphenyl phosphite,
distearyl pentaerythritol diphosphite,
tetrakis-(2,4-di-tert-butylphenyl)-4,4'-biphenylene diphosphonite,
tris-(2,3-di-tert-butylphenyl)phosphite,
butylated hydroxy toluene,
dicetyl thiodipropionate,
dimyristyl thiodipropionate, and
poly(1,4-cyclohexylene-3,3'-thiodipropionate, partially terminated with stearyl alcohol,
as well as mixtures of any two or more thereof.

4. A composition in accordance with claim 2 wherein said processing aids are selected from the group consisting of talc, clay, diatomaceous earth, metallic s alkyl bisstearamides, glycerol monostearates, polyethylene glycol, erucamid, and oleamid, as well as mixtures of any two or more thereof.

5. A composition in accordance with claim 2 wherein said colorants are selected from the group consisting of:
poly(ethylene terephthalate) copolymerized with 1,5-bis[(3-hydroxy-2,2'-dimethylpropyl)amino]anthraquinone,
poly(neopentylene terephthalate) copolymerized with 2,2'-(9,10-dihydro-9,10-dioxo-1,5-anthracenediyl)diimino)-bis-benzoic acid, and
poly(neopentylene naphthalene-2,6-dicarboxylate) copolymerized with 1,5-bis[(3-hydroxy-2,2-dimethylpropyl)-amino]anthraquinone.

6. A composition in accordance with claim 2 wherein said antistatic agents are selected from the group consisting of glycerol monostearates, ethoxylated amines, polyethylene glycols, and quaternary ammonium compounds, as well as mixtures of any two or more thereof.

7. A composition in accordance with claim 2 wherein said coupling agents are selected from the group consisting of silanes titanates, chromium complexes, carboxyl-substituted polyolefins, carboxyl-substituted acrylates, and paraffins, as well as mixtures of any two or more thereof.

8. A composition in accordance with claim 2 wherein said UV stabilizers are selected from the group consisting of:
2-hydroxy-4-octoxybenzophenone,
2-hydroxy-4-isooctoxy-benzophenone,
4-hydroxy-4-n-dodecycloxybenzophenone,
2-(3-di-tert-butyl-2-hydroxy-5-methylphenyl-5-chlorobenzyltriazole,
2-(2-hydroxy-3,5-di-tert-amylphenyl)-benzotriazole,
para-tert-butylphenyl salicylate,
2,4-di-tert-butylphenyl-3,5-di-tert-butyl-4-hydroxybenzoate,
nickel bis-ortho-ethyl(3,5-di-tert-butyl-4-hydroxybenzyl) phosphonate, and
2,2',6,6'-tetramethyl-4-piperidinyl sebacate,
as well as mixtures of any two or more thereof.

9. A composition in accordance with claim 2 wherein said flame retardant is selected from the group consisting of:
decabromodiphenyl oxide,
dodecachlorodimethane dibenzocyclooctane,
ethylene bis-dibromo norbornane dicarboxamide,
ethylene bis-tetrabromophthalimide, and
antimony trioxide,
as well as mixtures of any two or more thereof.

10. A composition in accordance with claim 2 wherein said metal deactivating agent is selected from the group consisting of:
oxalyl bis-(benzylidene hydrazide), and
2,2'-oxamido bis-(ethyl 3-(3,5-di-tert-butyl-4-hydroxyphenyl) propionate,
as well as mixtures of any two or more thereof.

11. A composition in accordance with claim 2 wherein said nucleating agent is selected from the group consisting of sodium benzoate, diphenyl phosphinic acid, the magnesium, sodium, calcium, and aluminum salts of diphenyl phosphinic acid, phenyl phosphinic acid, the magnesium, sodium, calcium, and aluminum salts of phenyl phosphinic acid, phenyl phosphorous acid, and the magnesium, sodium, calcium, and aluminum salts of phenyl phosphorous acid, as well as mixtures of any two or more thereof.

12. A composition in accordance with claim 1 wherein said surfactant having a low hydrophobic-lipophobic balance value has a hydrophobic-lipophobic balance value which falls in the range of about 2 up to 8.

13. A composition in accordance with claim 12 wherein said surfactant having a low hydrophobic-lipophobic balance value is selected from the group consisting of:
mono- and diglycerides,
sorbitan fatty acid esters,
polyoxyethylene sorbitol esters,
polyoxyethylene alcohols,
ethoxylated alkylphenols,
ethoxylated alcohols,
polyalkylene glycol ethers,
phosphated mono- and diglycerides,
citric acid esters of monoglycerides, diacetylated tartaric acid esters of monoglycerides,
glycerol monooleate,
sodium stearoyl lactylates,
calcium stearoyl lactylates,
phospholipids, and
phosphatidyl ethanolamine,
as well as mixtures of any two or more thereof.

14. A composition in accordance with claim 1 containing about 1 to about 50 weight percent of an emulsifiable wax, based on the weight of the polymer additive.

15. A process for dispersing in water one or more meltable polymer additives and, optionally, one or more higher melting polymer additives, said process comprising contacting the composition of claim 1 with an aqueous medium under conditions of agitation and for a time sufficient to wet said composition with water.

* * * * *

UNITED STATES PATENT AND TRADEMARK OFFICE
CERTIFICATE OF CORRECTION

PATENT NO. : 5,300,256
DATED : April 5, 1994
INVENTOR(S) : Mahendra K. Sharma

It is certified that error appears in the above-identified patent and that said Letters Patent is hereby corrected as shown below:

Column 15, line 51 should read as follows:

ing of talc, clay, diatomaceous earth, metallic, stearates alkyl

Column 15, line 34 should read as follows:

diphosphite

Column 16, line 7 should read as follows:

rylates, and chlorinated paraffins, as well as mixtures of any two or

Signed and Sealed this

Twenty-sixth Day of July, 1994

Attest:

BRUCE LEHMAN

Attesting Officer    Commissioner of Patents and Trademarks